(12) United States Patent
Chou et al.

(10) Patent No.: US 7,988,370 B2
(45) Date of Patent: Aug. 2, 2011

(54) CAMERA WITH ELECTROACTIVE TELESCOPIC SHUTTER MODULE

(75) Inventors: Tai-Hsu Chou, Taipei Hsien (TW); Yuan-Hsu Chou, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/716,406

(22) Filed: Mar. 3, 2010

(65) Prior Publication Data

US 2011/0019993 A1    Jan. 27, 2011

(30) Foreign Application Priority Data

Jul. 21, 2009    (CN) .......................... 2009 1 0304571

(51) Int. Cl.
*G02F 1/00*    (2006.01)
(52) U.S. Cl. ...................... 396/457; 359/295
(58) Field of Classification Search ................. 396/249, 396/262, 457; 359/295
See application file for complete search history.

(56) References Cited

U.S. PATENT DOCUMENTS

| 2008/0124072 A1* | 5/2008 | Yuan | 396/457 |
| 2010/0021156 A1* | 1/2010 | Lin | 396/457 |

* cited by examiner

*Primary Examiner* — W. B. Perkey
*Assistant Examiner* — Fang-Chi Chang
(74) *Attorney, Agent, or Firm* — Raymond J. Chew

(57) ABSTRACT

A camera includes a lens module, an image sensor, and a shutter module. The centers of the image sensor and the shutter module are on an optical axis of the lens module. The shutter module includes a frame and an electroactive telescopic unit having a first electroactive polymer layer, two compliant electrode layers, and two second electroactive polymer layers. The center of the electroactive telescopic unit has a through hole through the first electroactive polymer layer, the two compliant electrode layers, and the two second electroactive polymer layers. A central axis of the through hole and the optic axis of the lens module are coaxial. The electroactive telescopic unit is contractible or expandable along a direction perpendicularly to the optic axis of the lens module in response to a change in a voltage applied between the two compliant electrode layers.

7 Claims, 5 Drawing Sheets

US 7,988,370 B2

CAMERA WITH ELECTROACTIVE TELESCOPIC SHUTTER MODULE

BACKGROUND

1. Technical Field

The disclosure relates to cameras and, more particularly, to a camera with an electroactive telescopic shutter module.

2. Description of the Related Art

Conventional cameras mainly apply an electronic shutter or a mechanical shutter. Both the electronic shutter and the mechanical shutter need a complex drive structure and multiple components to control the response time of the shutter. Therefore, when the camera takes a photograph, the complex components of the shutter generate friction, which makes noises and slows the response speed, thereby affecting the quality of image forming of the camera.

BRIEF DESCRIPTION OF THE DRAWINGS

The components in the drawings are not necessarily drawn to scale, the emphasis instead being placed upon clearly illustrating the principles of the camera with an electroactive telescopic shutter module. Moreover, in the drawings, like reference numerals designate corresponding parts throughout the several views.

DETAILED DESCRIPTION

Figure 1:
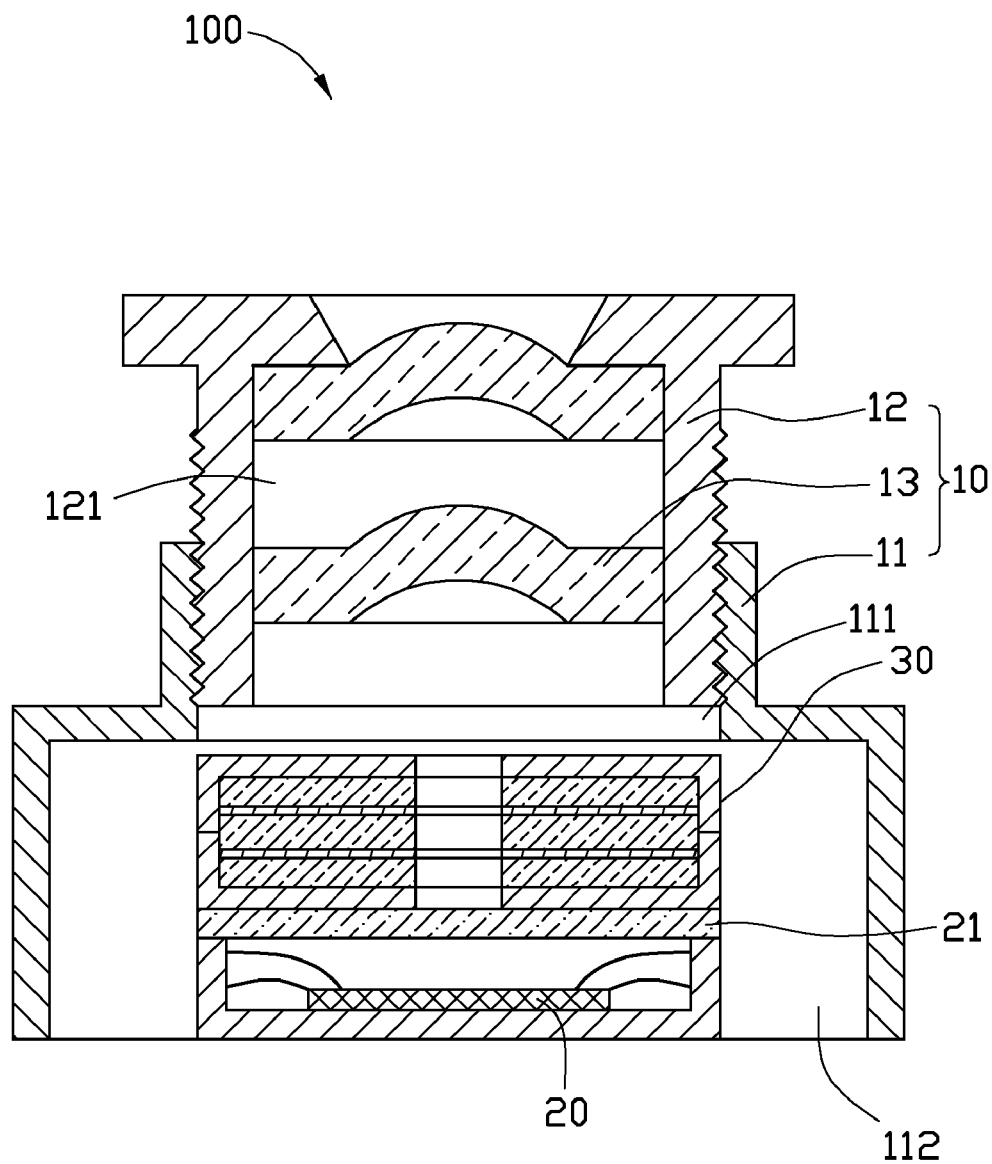
FIG. 1 is a schematic view of a camera with an electroactive telescopic shutter module in accordance with an embodiment.

FIG. 1 is a schematic view of a camera with an electroactive telescopic shutter module in accordance with an embodiment. The camera with an electroactive telescopic shutter module (hereinafter "camera") 100 includes a lens module 10, an image sensor 20, and a shutter module 30. The centers of the image sensor 20 and the shutter module 30 are on an optical axis of the lens module 10. The lens module 10 includes a lens holder 11, a lens barrel 12, and a pair of lenses 13. The lens barrel 12 is connected with the lens holder 11 via screw thread as described below. The pair of lenses 13 is received in the lens barrel 12. The lens holder 11 is defined a first receiving hole 111 and a second receiving hole 112. The lens barrel 12 is connected with the lens holder 11 via an outer screw thread of an outer surface of the lens barrel 12 and an inner screw thread of an inner surface of the first receiving hole 111. The lens barrel 12 defines a third receiving hole 121. The pair of lenses 13 is received in the third receiving hole 121.

The image sensor 20 is received in the second receiving hole 112. A transparent board 21 is positioned on the image sensor 20. The transparent board 21 is utilized for protecting the image sensor 20 from dust and dirt.

Figure 2:
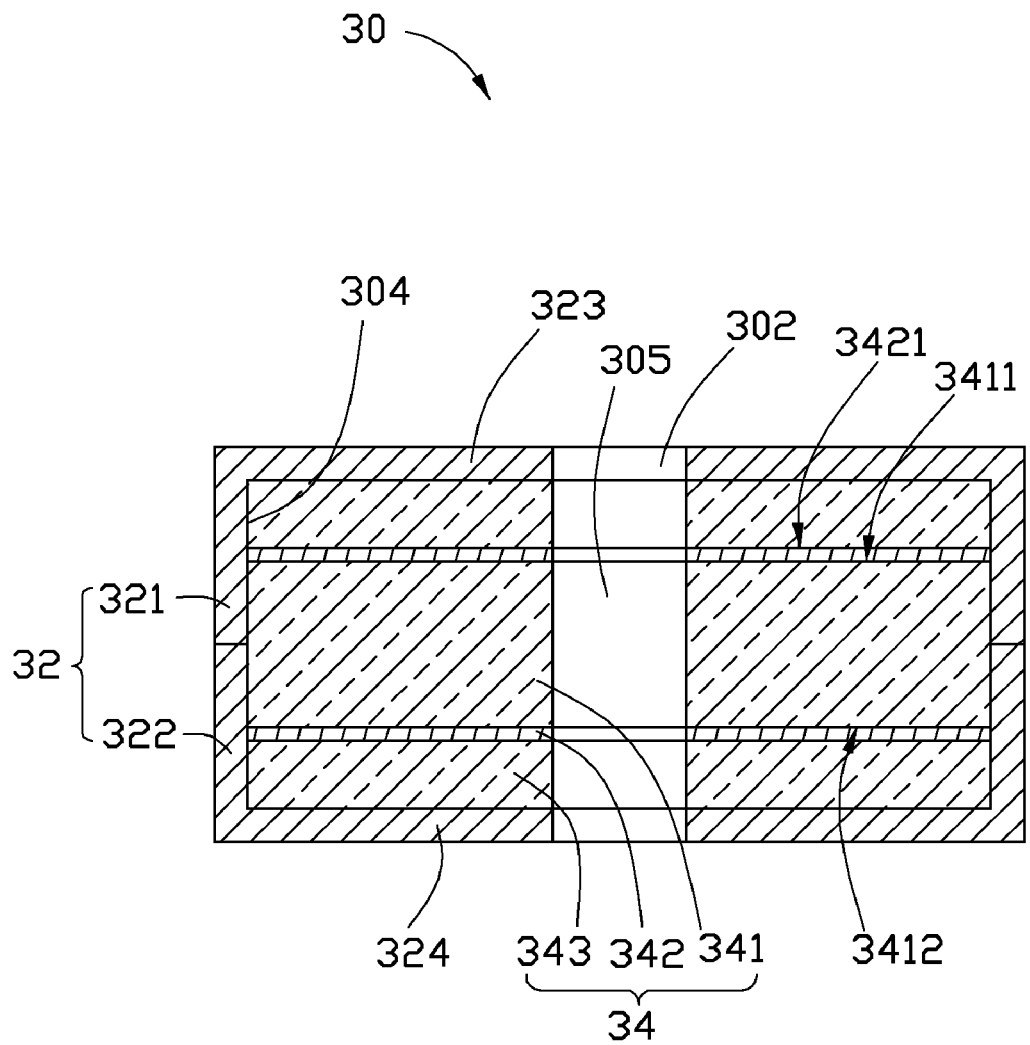
FIG. 2 is a schematic view of a shutter module of the camera of FIG. 1, in an open state.

FIG. 2 is a schematic view of the shutter module 30 of FIG. 1, in an open state. The shutter module 30 includes a frame assembly 32 and an electroactive telescopic unit 34. The electroactive telescopic unit 34 is received in the frame assembly 32. The frame assembly 32 further includes a top frame 321 and a bottom frame 322. A receiving space 304 is formed between the top frame 321 and the bottom frame 322 and accommodates the electroactive telescopic unit 34. The top frame 321 further includes a top board 323 perpendicular to the optical axis of the lens module 10. The bottom frame 322 further includes a bottom board 324 perpendicular to the optical axis of the lens module 10. The center of the top board 323 and the bottom board 324 has a through hole 302 for passing through light from the pair of lens 13. The diameter of the through hole 302 is equal to the biggest aperture of the shutter module 30 in an open state.

The electroactive telescopic unit 34 further includes a first electroactive polymer layer 341, two compliant electrode layers 342, and two second electroactive polymer layers 343. The first electroactive polymer layer 341 is connected with the second electroactive polymer layer 343 via the compliant electrode layer 342. The first electroactive polymer layer 341 has a top surface 3411 and a bottom surface 3412. One of the two compliant electrode layers 342 is positioned on the surface 3411 and the other is positioned on the opposite surface 3412. Each compliant electrode layer 342 has a surface 3421 far from the first electroactive polymer layer 341. The second electroactive polymer layer 343 is positioned on the surface 3421 of the compliant electrode layer 342.

A thickness of the first electroactive polymer layer 341 along the optical axis of the lens module 10 is greater than that of the second electroactive polymer layer 343. The thickness of the first electroactive polymer layer 341 is in the range from 0.2 to 0.8 mm. The thickness of the second electroactive polymer layer 343 is in the range from 0.02 to 0.15 mm. A thickness of the compliant electrode layer 342 along the optical axis of the lens module 10 is in the range from 10 to 200 μm.

When the shutter module 30 is in the open state, the center of the electroactive telescopic unit 34 has a through hole 305 along the direction perpendicularly to the optic axis of the lens module 10 through the first electroactive polymer layer 341, the two compliant electrode layers 342, and the second electroactive polymer layers 343. A central axis of the through hole 305 and the optical axis of the lens module 10 are coaxial. The two compliant electrode layers 342 are connected with an electronic circuit (not shown). The electronic circuit provides voltages between the two compliant electrode layers 342 to control the first electroactive polymer layer 341 and the second electroactive polymer layers 343 to contract or expand.

The electroactive telescopic unit 34 is contractible or expandable along the direction perpendicularly to the optical axis of the lens module 10 in response to a change in a voltage applied between the two compliant electrode layers 342, thus changing the diameter of the through hole 305 and controlling the amount of the light passing through the through hole 305. For example, when the voltage between the two compliant electrode layers 342 is in the range from 4 to 7V, the electroactive telescopic unit 34 will contract or expand along the direction perpendicularly to the optical axis of the lens module 10, the diameter of the through hole 305 is changed, and the amount of the light passing through the through hole 305 is adjusted. Therefore, when the voltage between the two compliant electrode layers 342 is equal to 7V, a response time of the electroactive telescopic unit 34 is between several milliseconds and several microseconds, in other words, a response speed of the electroactive telescopic unit 34 is fast.

Figure 3:
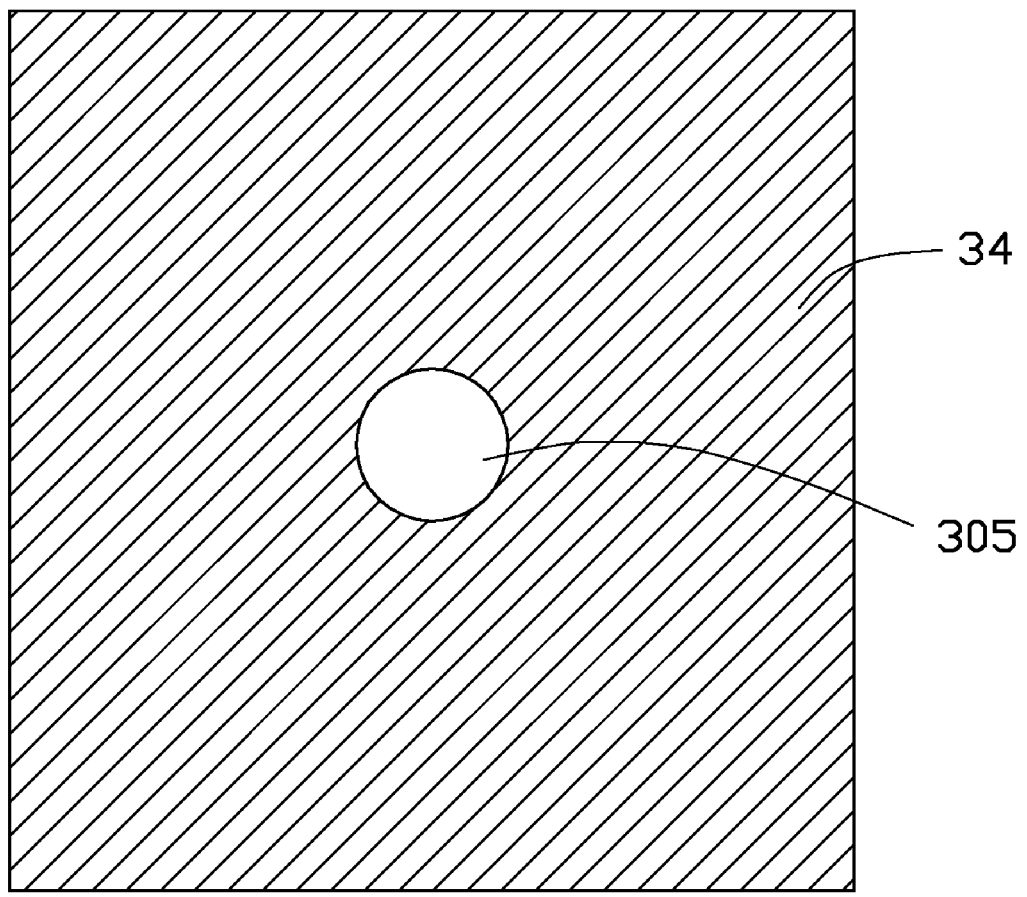
FIG. 3 is a schematic view of an electroactive telescopic unit of the shutter module of FIG. 2.

In this embodiment, the electroactive telescopic unit 34 is a cube. As shown in FIG. 3, a section plane of the electroactive telescopic unit 34 along the direction perpendicularly to the optical axis of the lens module 10 is a square. In other embodiments, the section plane of the electroactive telescopic unit along the direction perpendicularly to the optical axis of the lens module can be a circle, a rectangle, a triangle or a polygon, etc.

The first electroactive polymer layer 341 can be made of silicone, polyurethane elastomer or acrylic elastomer, etc. The second electroactive polymer layer 343 can be also made of silicone, polyurethane elastomer or acrylic elastomer, etc. The compliant electrode layer 342 is positioned on the surface 3411 or the opposite surface 3412 by means of a rotating painting or printing method using carbon colloid, gold colloid, silver colloid or copper colloid, etc, a spray painting method using graphite, a splash plating method using platinum, or an adhesive method using high elasticity carbon nanotubes film. The second electroactive polymer layer 343 is positioned on the surface 3421 by means of a paper coating or adhesive method.

Figure 4:
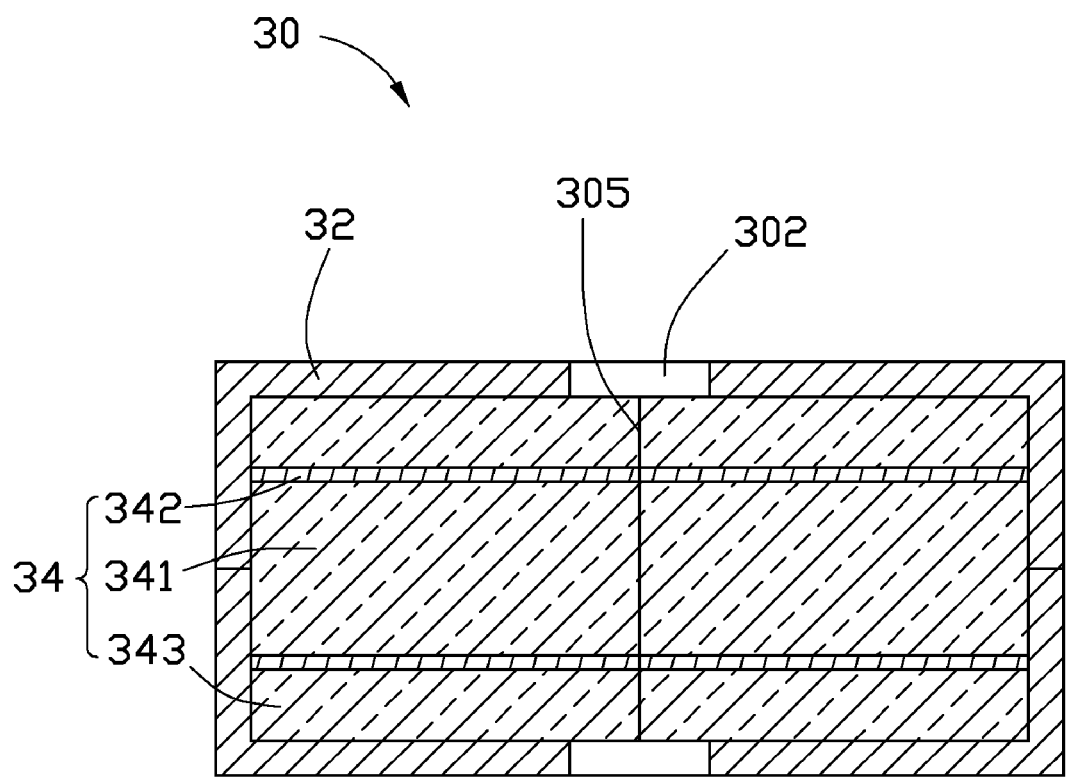
FIG. 4 is a schematic view of a shutter module of the camera of FIG. 1, in a closed state.

As shown in FIG. 4, when a corresponding voltage, for example, 7.5V, is applied between the two compliant electrode layers 342, the through hole 305 of the electroactive telescopic unit 34 quickly disappears, and the shutter module 30 is quickly closed. Therefore, the electroactive telescopic unit 34 can effectively control the through hole 305 to open or close.

Figure 5:
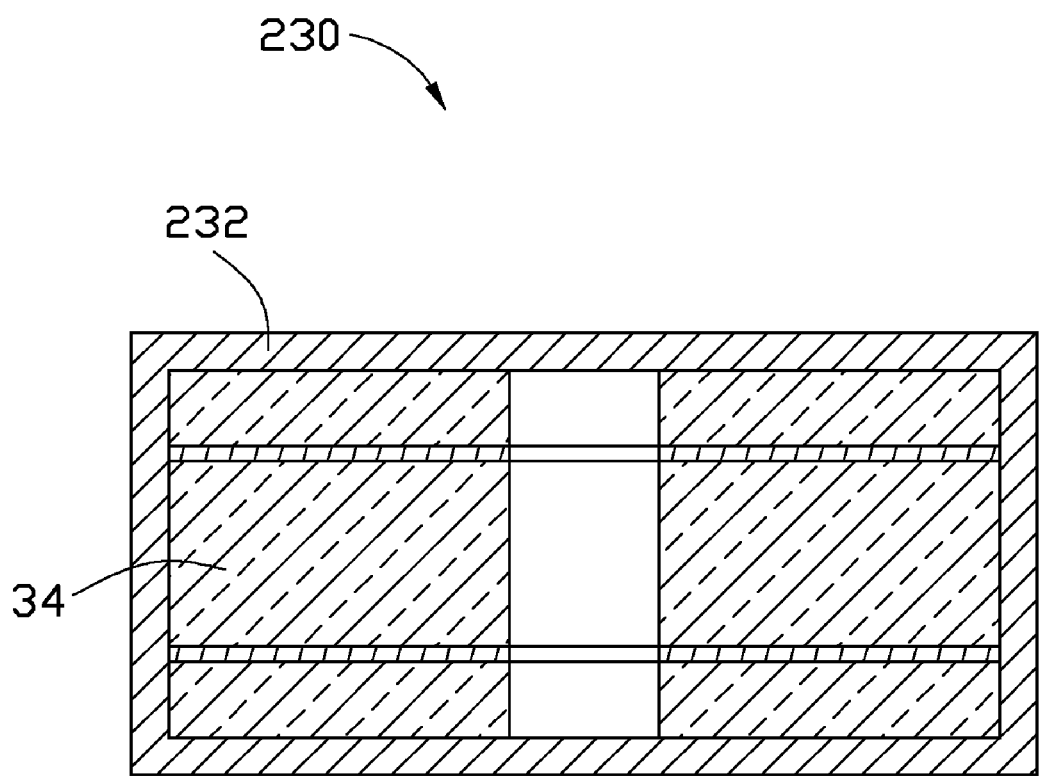
FIG. 5 is a schematic view of a shutter module of a camera, in accordance with another embodiment.

FIG. 5 is a schematic view of a shutter module of a camera, in accordance with another embodiment. The frame 232 is made of light-pervious material and incorporated with the shutter module 230 of the camera. The incorporated frame 232 seals the electroactive telescopic unit 34. Therefore, the frame 232 does not include a through hole and directly passes through the light to the electroactive telescopic unit 34.

It is understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A camera with an electroactive telescopic shutter module comprising:
    a lens module;
    an image sensor; and
    a shutter module comprising a frame and an electroactive telescopic unit received in the frame;
    wherein the centers of the image sensor and the shutter module are on an optical axis of the lens module, and the electroactive telescopic unit comprises:
        a first electroactive polymer layer;
        two compliant electrode layers positioned on opposite surfaces of the first electroactive polymer layer; and
        two second electroactive polymer layers positioned on opposite sides of the respective compliant electrode layers to the first electroactive polymer layer;
        wherein a thickness of the first electroactive polymer layer is greater than that of the second electroactive polymer layer, the center of the electroactive telescopic unit has a through hole through the first electroactive polymer layer, the two compliant electrode layers, and the two second electroactive polymer layers, a central axis of the through hole and the optic axis of the lens module are coaxial, and the electroactive telescopic unit is contractible or expandable along a direction perpendicularly to the optic axis of the lens module in response to a change in a voltage applied between the two compliant electrode layers, thus changing the diameter of the through hole and controlling the amount of the light passing through the through hole.

2. The camera as recited in claim 1, wherein the thickness of the first electroactive polymer layer is in the range from 0.2 to 0 8 mm and the thickness of the second electroactive polymer layer is in the range from 0.02 to 0.15 mm.

3. The camera as recited in claim 1, wherein the thickness of the compliant electrode layer along the optical axis of the lens is in the range from 10 to 200 μm.

4. The camera as recited in claim 1, wherein the center of the frame has another through hole aligned with the optical axis of the lens module.

5. The camera as recited in claim 4, wherein the frame comprises a top frame and a bottom frame, and the electroactive telescopic unit is received between the top frame and the bottom frame.

6. The camera as recited in claim 1, wherein the frame is made of light-pervious material and incorporated with the shutter module.

7. The camera as recited in claim 1, wherein the material of the first electroactive polymer layer or the second electroactive polymer layer is selected from the group consisting of silicone, polyurethane elastomer, and acrylic elastomer.

* * * * *